UNITED STATES PATENT OFFICE.

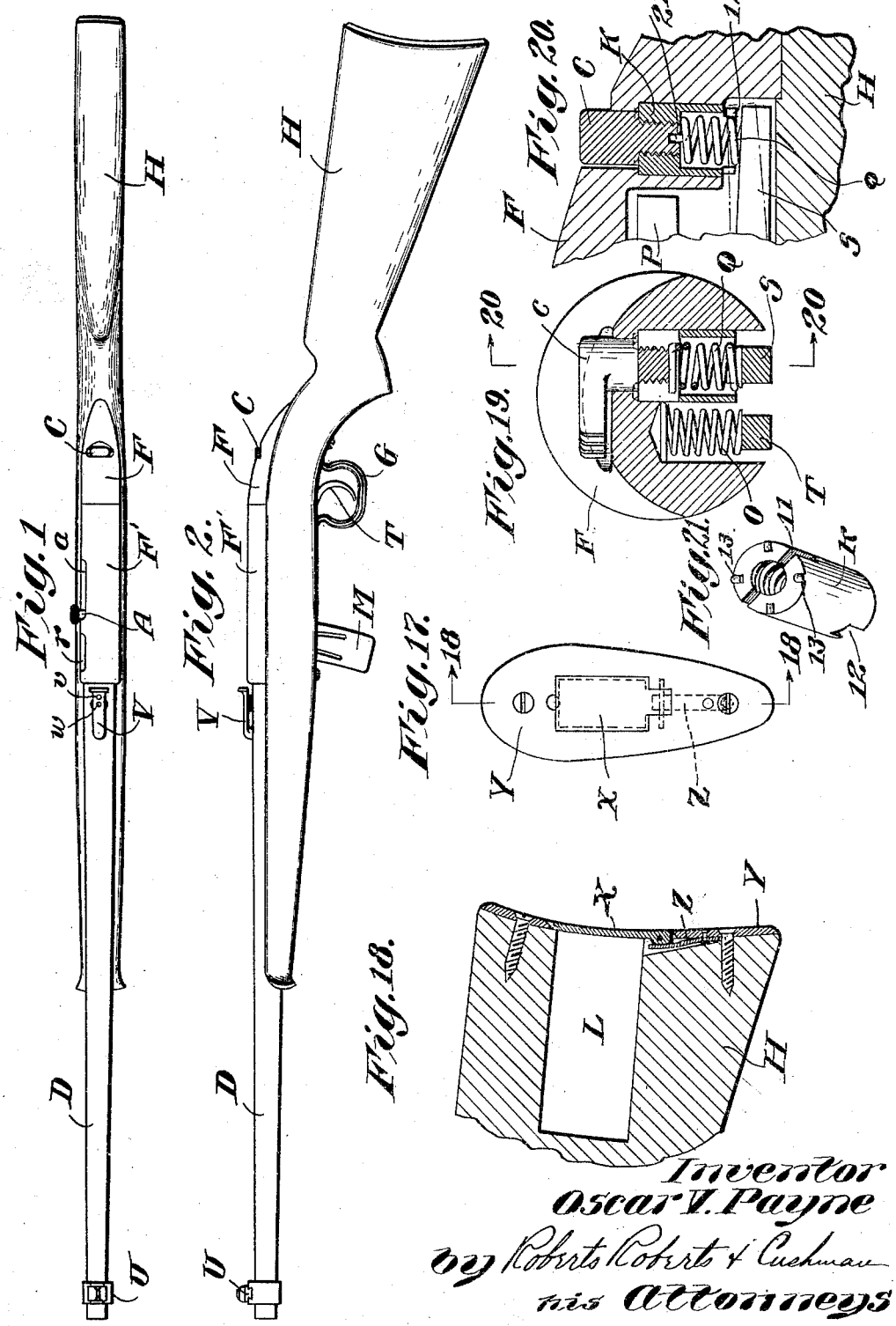

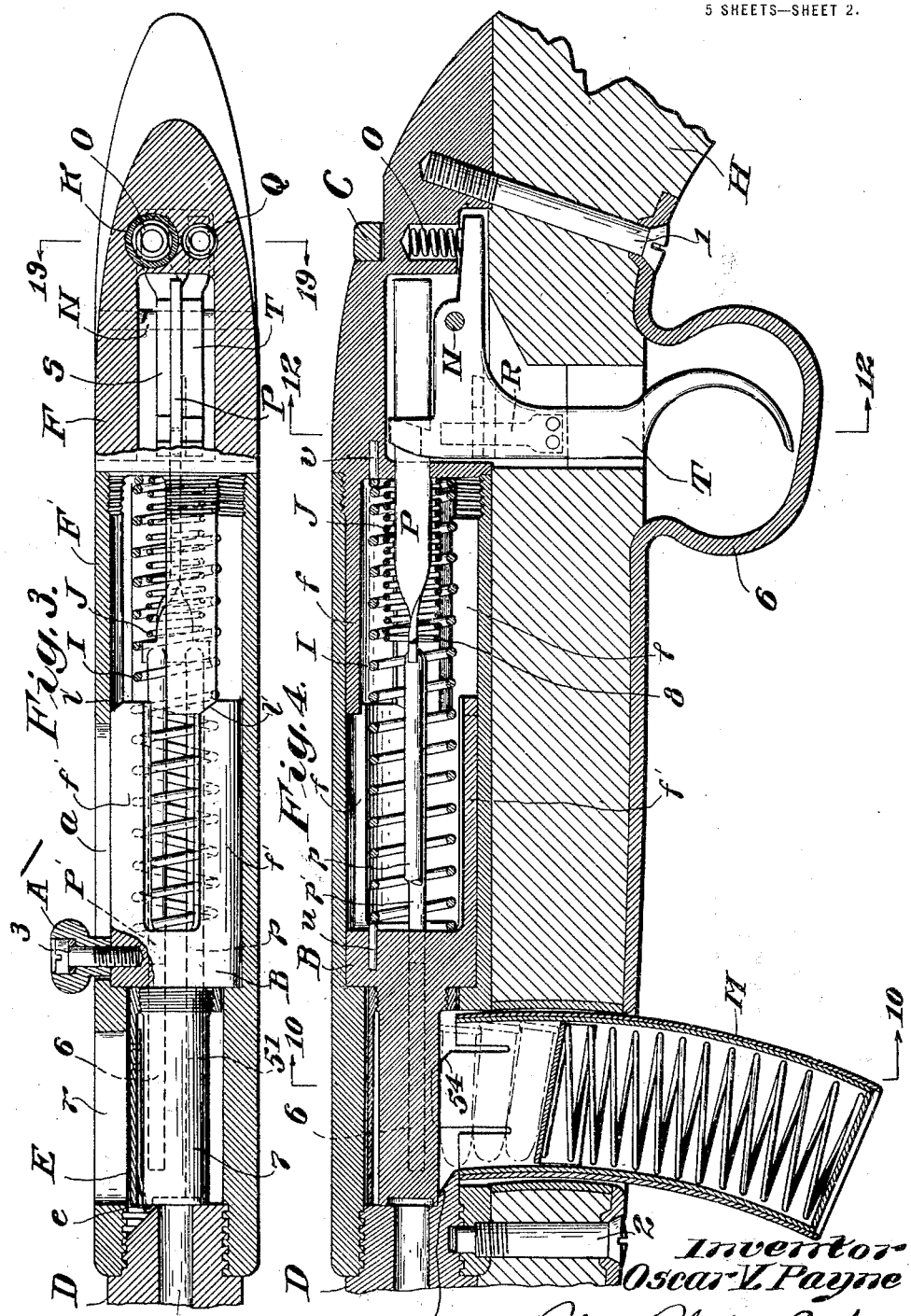

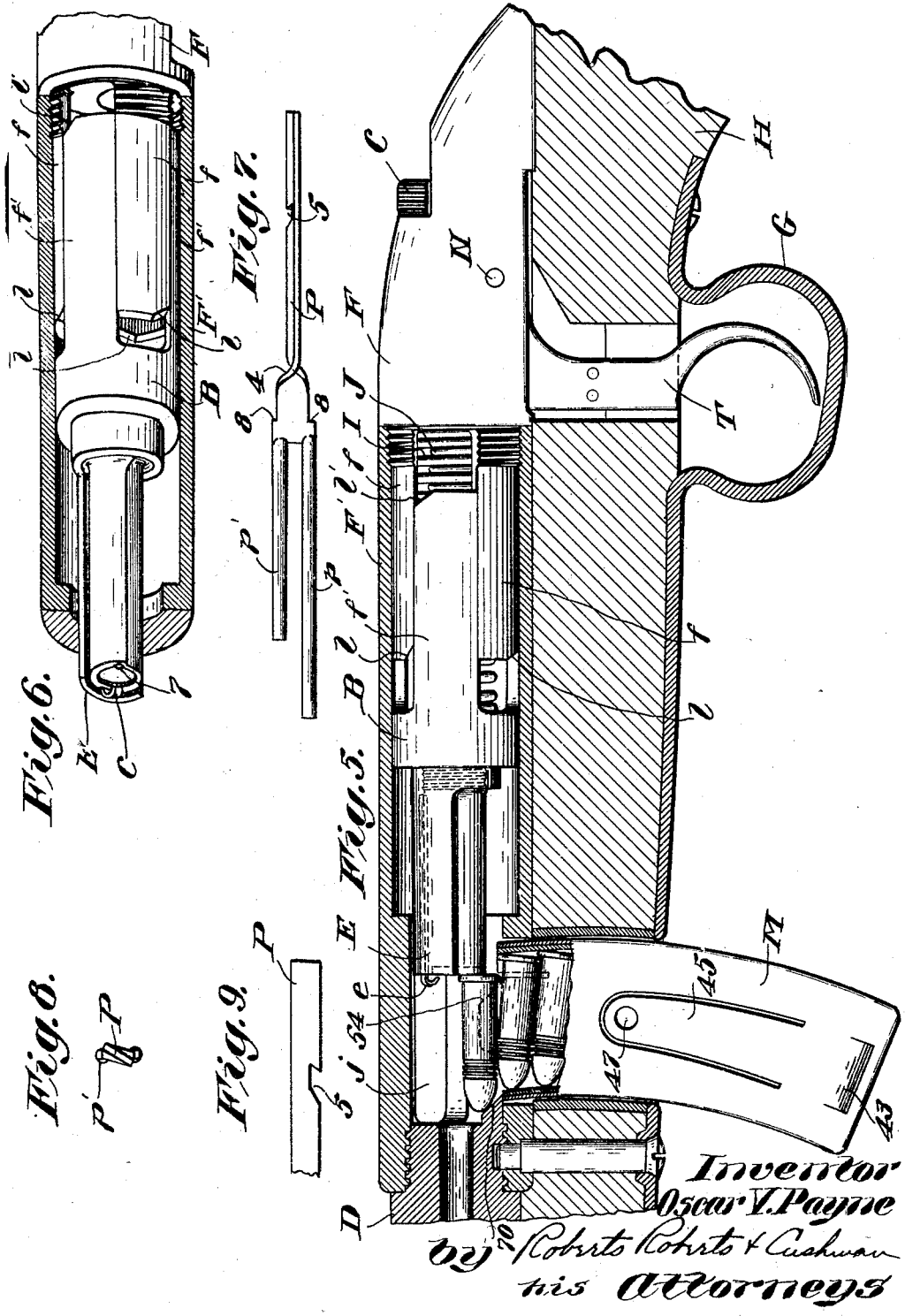

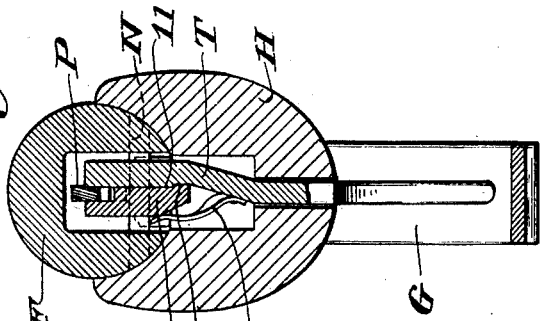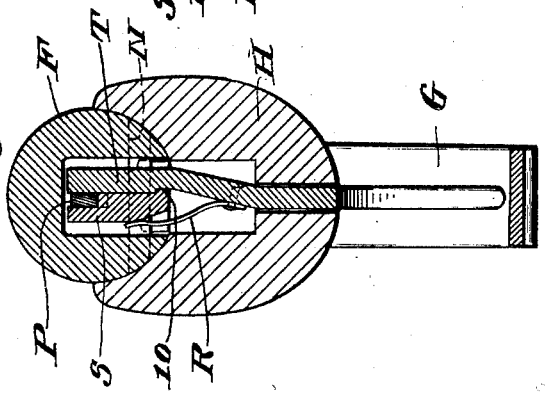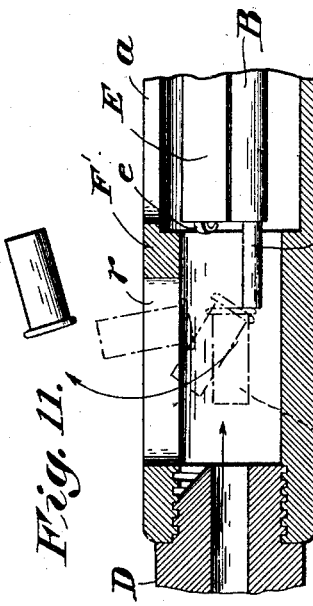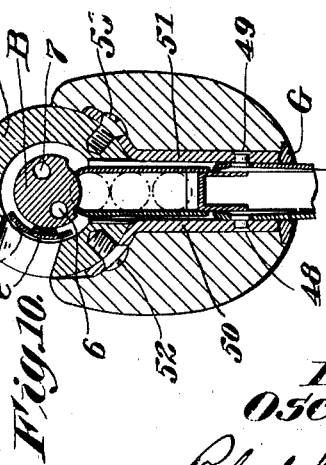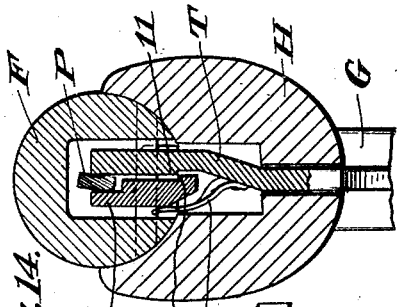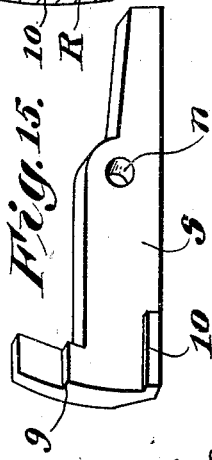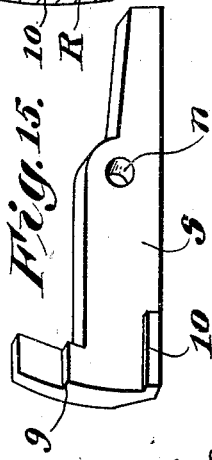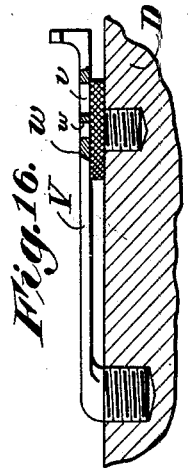

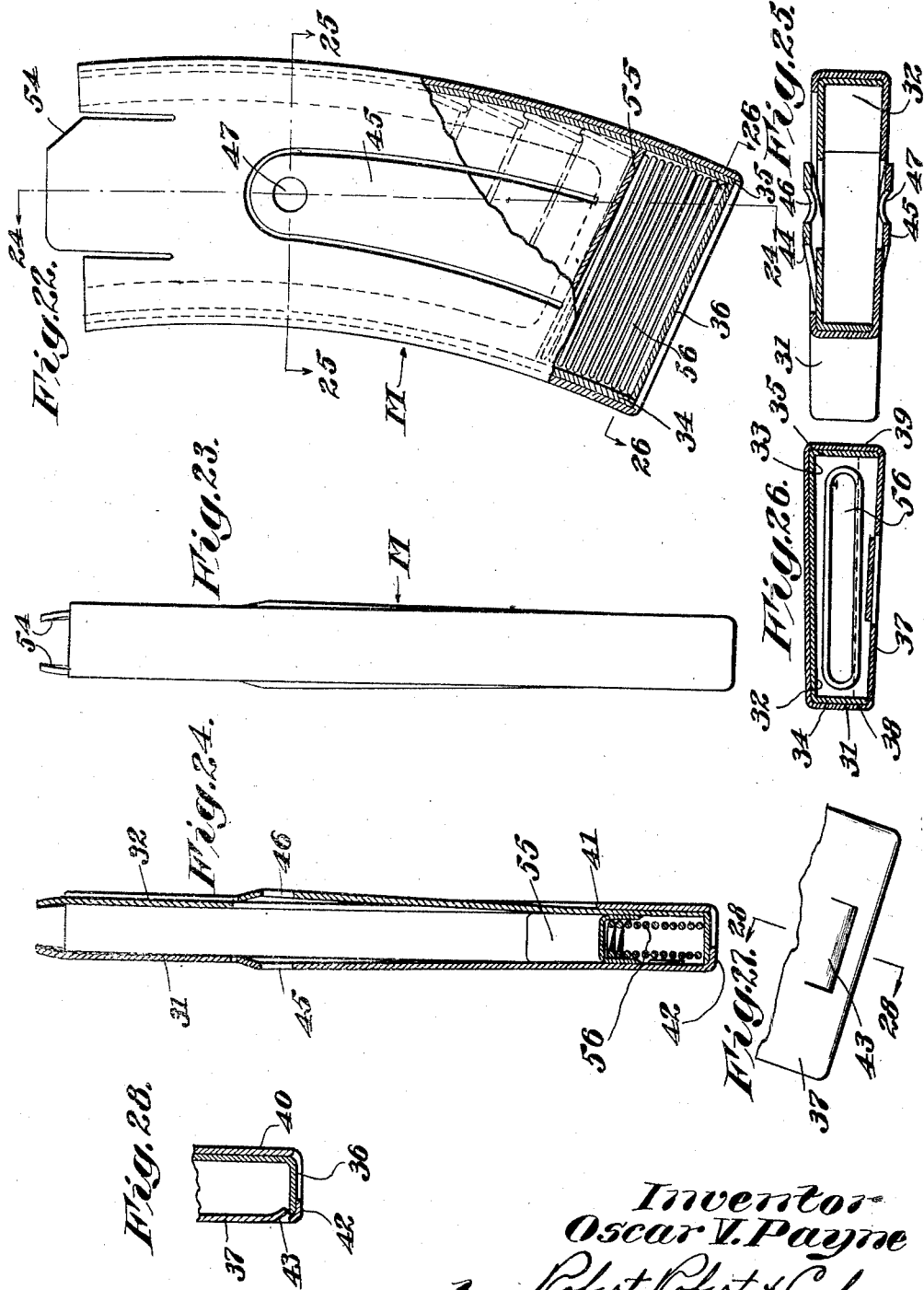

OSCAR V. PAYNE, OF CLEVELAND, OHIO, ASSIGNOR TO AUTO-ORDNANCE CORPORATION, OF NEW YORK, N. Y., A CORPORATION OF NEW YORK.

GUN.

1,352,413. Specification of Letters Patent. Patented Sept. 7, 1920.

Application filed August 18, 1919. Serial No. 318,202.

*To all whom it may concern:*

Be it known that I, OSCAR V. PAYNE, a citizen of the United States, and resident of Cleveland, in the county of Cuyahoga and State of Ohio, have invented new and useful Improvements in Guns, of which the following is a specification.

This invention relates particularly to semi-automatic fire arms of small caliber but in many of its aspects the invention is also applicable to high power firearms and even to large guns—whether full automatic, semi-automatic, or manual.

The objects of the invention are to provide a simple and reliable gun which can be manufactured rapidly and at small cost, to reduce the number of parts required to produce the desired functions, to improve the shape of the parts, to facilitate the manufacture and assembly thereof, to provide an improved application of the discovery disclosed in the patent to Blish No. 1,131,319, granted March 9, 1915, whereby the breech closure is locked in closed position during high breech pressure and automatically unlocked directly in response to the breech pressure acting upon the breech closure when the breech pressure decreases to a safe value, to provide improved firing mechanism and safety mechanism, to provide an improved magazine and rear sight, and generally to improve the construction of guns of the character referred to.

For the purpose of more clearly disclosing the nature of the invention a specific embodiment thereof in a .22 caliber target rifle is illustrated in the accompanying drawings, in which—

Figure 1 is a top plan of the gun;

Fig. 2 is a side elevation of the gun;

Fig. 3 is a horizontal central longitudinal section of the center part of the gun, part being shown in elevation;

Fig. 4 is a vertical central longitudinal section of the central part of the gun;

Fig. 5 is a view similar to Fig. 4 showing parts in elevation and showing the bolt partially advanced;

Fig. 6 is a perspective view of the bolt and a part of the frame, a part of the frame being shown in section;

Fig. 7 is a perspective view of the firing pin;

Fig. 8 is a rear elevation of the firing pin;

Fig. 9 is a side elevation of a portion of the firing pin;

Fig. 10 is a vertical transverse section on line 10—10 of Fig. 4, parts being broken away;

Fig. 11 is a horizontal central longitudinal section of the central portion of the gun, showing the bolt in retracted position;

Fig. 12 is a vertical transverse section on line 12—12 of Fig. 4, showing the firing mechanism in position ready to fire;

Fig. 13 is a similar section showing the firing mechanism in the position occupied at the instant of firing;

Fig. 14 is a similar view showing the firing mechanism in the position occupied at the instant the bolt is automatically unlocked after firing;

Fig. 15 is a perspective view of the sear;

Fig. 16 is a side elevation of the rear sight showing a portion of the barrel in section;

Fig. 17 is an elevation of the butt end of the gun;

Fig. 18 is a section on line 18—18 of Fig. 17;

Fig. 19 is a section on line 19—19 of Fig. 3;

Fig. 20 is a section on line 20—20 of Fig. 19;

Fig. 21 is a perspective view of a portion of the safety catch;

Fig. 22 is a side elevation of the magazine, showing a part broken away;

Fig. 23 is a rear elevation of the magazine;

Fig. 24 is a section on line 24—24 of Fig. 22;

Fig. 25 is a section on line 25—25 of Fig. 22;

Fig. 26 is a section on line 26—26 of Fig. 22;

Fig. 27 is a side elevation of the lower end of the magazine viewed from the left-hand side; and Fig. 28 is a section on line 28—28 of Fig. 27.

The particular embodiment of the invention shown for the purpose of illustration comprises in general a stock H, a barrel D, two frame members F and F', a trigger guard G, front and rear sights U and V, a bolt B, a firing pin P, a trigger T, a sear S, and a magazine M. The barrel D and frame member F' may be made integral or separate as shown. The stock is of the general shape illustrated in Figs. 1 and 2, being provided with a groove along the top to receive the barrel and the frame members and being provided with two vertical openings to receive the trigger and the magazine. The trigger guard G extends from a point in the rear of the trigger to a point in advance of the magazine and is provided with an opening to receive the magazine M. The trigger guard is held in position by means of two screws 1 and 2 passing through the stock and threading into the frame members F and F', respectively, the screw 2 projecting into a recess in the barrel D to lock the barrel in position relative to frame member F' into which it is threaded.

The frame members F and F' are in general cylindrical, the member F being rounded off at the rear end as shown in Figs. 2, 4 and 5. The member F' is hollow so that it is tubular throughout its entire length. The forward end of frame member F is tubular and the forward end of this tubular portion is threaded to receive the threaded rearward end of the frame member F', these two parts telescoping snugly together. The tubular portion of frame member F is provided with three longitudinal slots which divide the tube into three fingers $f$, the forward ends of these fingers being beveled on the counter-clockwise side as indicated at $l$. The forward end of the frame member F' has a small internal diameter so as just to receive the forward portion of the bolt B. The frame member F' is provided with an opening $r$ on the right-hand side through which cartridge cases may be ejected as illustrated in Fig. 11.

The bolt B comprises a central body portion, a forward portion of smaller diameter, and a rearward tubular extension which is longitudinally slotted so as to be divided into three fingers $f'$, the ends of these fingers being beveled at $l'$ at the same angles as the fingers $f$ are beveled at $l$. The fingers $f$ and $f'$ are of substantially equal width so that the fingers $f$ will fit into the slots between the fingers $f'$ and so that the fingers $f'$ will fit into the slots between the fingers $f$ as illustrated in Figs. 5 and 6. The bolt B is provided with an actuator A which projects through longitudinal slot $a$ in the frame member F' and which is secured by means of a screw 3. The rear end of the forward portion of the bolt is threaded to receive the threaded rearward portion of the extractor mount E, a spring extractor $e$ being secured to the mount E by means of rivets as shown in Fig. 3. The forward end of the extractor $e$ lies in a longitudinal groove in the bolt when the mount E is in proper position to prevent rotation of the mount E relative to the bolt (see Fig. 3). The extractor mount E is sufficiently wide to close the ejection opening $r$ when the bolt is in closed position as illustrated in Figs. 3 and 10. A coiled compression spring I is provided in the hollow frame members F and F' to actuate the bolt, the spring I being anchored at its forward and rearward ends to the bolt B and frame member F respectively as indicated at $u$ and $v$ (Fig. 4). In assembling the parts the spring I is placed under compression and torsion so that it will both advance the bolt and rotate the bolt in a clockwise direction into locked position as disclosed in my companion application Sr. No. 318,201, filed on even date herewith. The coil spring I is slightly smaller in diameter than the internal diameter of the fingers $f$ and $f'$ and is guided and positioned by these fingers.

The firing pin P, which is shown in detail in Figs. 7 to 9, comprises a flat rearward portion which is twisted through 70° at 4 and which is provided with a notch 5. Projecting forwardly from the flat portion of the pin are two pins $p$ and $p'$ which are adapted to extend into longitudinal openings 6 and 7 in the forward end of the bolt, the opening 7 passing entirely through the bolt and the opening 6 terminating near the forward end of the bolt as shown in Figs. 3 and 4. The pin $p$ serves both to fire the cartridge and to eject the empty cartridge case as hereinafter described while the pin $p'$ merely serves to assist in rotating the firing pin with the bolt when the bolt is rotated into and out of locking position. A coiled compression spring J is provided to actuate the firing pin, this spring being disposed within the spring I and butting at its forward and rearward ends against shoulders 8 on the firing pin and the frame member F respectively.

The firing mechanism comprises the trigger T and sear S, both of which are pivotally mounted on the pin N in the frame member F, the sear S being provided with an opening $n$ to receive the pin N as shown in Fig. 15. As shown in Figs. 12 to 14 inclusive the trigger and sear are normally held together by means of a spring R but are adapted to be moved apart when the firing pin P is rotated into the position shown in Fig. 14 by the bolt B being rotated in a counter-clockwise direction to unlock the bolt. The sear S is provided with a shoulder 9 which is adapted to engage in the notch 5 in the firing pin when the gun is cocked and also with a shoulder 10 which is adapted to fit under the shoulder 11 on the firing pin when the gun is cocked. The trigger and sear are respectively urged in a clockwise direction (Fig. 4) by coiled compression springs O and Q fitting into sockets in the frame member F.

The safety catch for locking the gun in safe position comprises a member C mounted in a recess in the top of the frame member F and having a portion extending downwardly through an opening in the frame member into the socket containing sear spring Q. The lower end of member C is provided with a transverse slot 21. The safety catch also comprises a member K, shown in perspective in Fig. 21, which is provided with a threaded axial opening at the upper end adapted to receive the threaded lower end of the member C. Member K is provided with a longitudinal slot 11 at the upper end and with a longitudinal slot 12 at the lower end, the two slots being circumferentially spaced at right-angles. The upper end of the member K is provided with four radial ribs 13 spaced 90° apart and extending inwardly from the outer periphery of the member K to the outer periphery of the member C when the two members are threaded together, the ribs 13 being adapted to seat into radial grooves in the frame member F when the safety catch is in either safe or firing position. The upper end of spring Q is straightened and bent into position to fit into the slots 11 and 12 in the members K and C respectively to lock the two members together.

As shown in Figs. 17 and 18 the butt of the stock is provided with a chamber L to receive a spare magazine and the butt plate Y is provided with a pivoted closure X for covering the mouth of the recess L, a spring Z being provided to hold the closure X either in open or closed position.

The rear sight shown in detail in Fig. 16 comprises a spring arm V having a sight notch on its rearward end and having a lug on its forward end threaded into the barrel D. Near the rearward end of the arm V are provided two openings $v$ and $w$. A thumb screw W is threaded into the barrel beneath the arm V and is provided with an axial lug extending into opening $w$. Thumb screw W is provided with radial indicating marks on its upper face which are visible through the opening $v$ and which are calibrated in terms of firing distances. By rotating the thumb screw the sight may be raised and lowered to adjust for different firing distances.

The magazine M shown in detail in Figs. 22 to 28 inclusive comprises two pressed metal portions 31 and 32 which telescope together, the portion 32 sliding into the portion 31 from the top. The inner portion 32 is provided with a right-hand side wall 33, a forward end 34, a rearward end 35 and a bottom 36, the left-hand side of this portion being open. The outer portion 31 is provided with a left-hand side wall 37, a front wall 38, a rear wall 39 and with a right-hand wall 40 extending upwardly to the line 41 in Fig. 24, the bottom of the outer portion being open except for an inturned lip 42. The left-hand side of the outer portion is provided with a struck-up lip 43 at the bottom to spring over the bottom 36 of the inner portion and hold the two portions together, as illustrated in Figs. 27 and 28. The portions 31 and 32 are provided with struck-up spring arms 44 and 45 which have openings 46 and 47 adapted to receive catches 48 and 49 riveted into plates 50 and 51 which are secured to the frame member F' by means of screws 52 and 53 as illustrated in Fig. 10. The upper ends of the side walls of the magazine are slotted as shown in Fig. 22 and the portions between these slots extend upwardly and inwardly to engage the uppermost cartridge in the magazine. The rearward corners of these upstanding portions are beveled at 54 to engage the rims of the cartridges as the cartridges are fed out of the magazine to the firing chamber. Cartridges are impelled upwardly by means of a follower 55 actuated by coil compression spring 56.

The operation of the illustrated embodiment of the invention is as follows:—When the bolt is in locked position as shown in Figs. 3 and 4 the beveled corners $l'$ of the fingers $f'$ engage the beveled corners $l$ of the fingers $f$. The obliquity of these corners relatively to the line of breech pressure is so low that the surfaces $l$ and $l'$ will not slide over each other when the breech pressure acting rearwardly through the bolt is relatively high so that the bolt will be automatically locked in closed position at high breech pressure according to the discovery disclosed in the aforesaid patent to Blish. On the other hand the obliquity of the surfaces $l$ and $l'$ is so high that when the breech pressure decreases to a relatively low value the surfaces will slide over each other permitting the bolt to rotate in a counter-clockwise direction until the fingers $f'$ come into alinement with the slots between the fingers $f$ whereupon the bolt is automatically retracted by the residual breech pressure against the action of the compression spring I. The obliquity of the locking surfaces $l$ and $l'$ depends upon a number of variable factors, such as breech pressure, the weight of the bolt, the character of the surfaces, etc., as fully disclosed in my prior applications, but for a .22 caliber rifle of the character illustrated the surfaces should be inclined at approximately 30° to a plane perpendicular to the line of breech pressure. Upon the unlocking of the bolt in a counter-clockwise direction the spring I is twisted, thereby imparting to the spring a torsion which rotates the bolt in a clockwise direction into locked position after the bolt has been retracted and then returned to forward position. If desired, this torsion may be supplemented by additional torsion applied to the spring in assembling the parts. In the rearward movement of the bolt the extractor e withdraws the empty cartridge case from the firing chamber and when the cartridge is retracted to the position indicated at 60 in Fig. 11, the firing pin p is projected beyond the face of the bolt thereby ejecting the empty case from the gun as illustrated in Fig. 11. The firing pin is projected beyond the forward face of the bolt by the rear end of the firing pin engaging the frame member F thereby stopping the rearward movement of the firing pin during the recoil of the bolt.

The operation of the firing mechanism is as follows:—When the gun is cocked as illustrated in Figs. 3, 4 and 12 the forward end of the firing pin p is located at 51 (Fig. 3). Upon pulling the trigger the sear S is rotated in a counter-clockwise direction (Fig. 4) about the pin N by virtue of the interengagement of the shoulders 10 and 11 on the sear and trigger respectively (Figs. 12 to 14). This rotation of the sear releases the firing pin which is plunged forwardly by the spring J until the pin p engages the rim of the cartridge and fires same. When the bolt is rotated in a counter-clockwise direction in unlocking the spaced pins p and p' of the firing pin transmit this rotative movement to the firing pin and the flat rearward end of the firing pin is tilted into the position shown in Fig. 14. This spreads the sear and trigger apart until the shoulders 10 and 11 disengage whereupon the sear is caused to rotate in a clockwise direction (Fig. 4) by spring Q into position to engage the notch 5 of the firing pin when it is retracted to firing position during the recoil of the bolt. By thus freeing the sear from the trigger on the instant of unlocking the sear is permitted to engage the firing pin whether or not the trigger is released before the firing pin is retracted. The sear S and trigger T are fitted loosely on the pin N so as freely to slide on the pin and so as even to tip laterally if necessary. Inasmuch as the firing pin is tilted into the position shown in Fig. 14 at all times other than when the bolt is in locked position the trigger is inoperative to actuate the sear except when the bolt is closed and locked.

The operation of the improved safety catch is as follows:—When the catch is in the position shown in Figs. 1, 2, 19 and 20, the slot 12 at the bottom of the member K is in position to permit the rear end of the sear to move upwardly thereinto when the trigger is pulled. The safety catch is held in this position by the radial ribs 13 on the upper end of member K seating in radial grooves in the top of the socket provided in frame F for member K, the member K being yieldingly urged upwardly by the spring Q. When it is desired to render the gun safe the member C is rotated in a counter-clockwise direction (Fig. 1) through 90° until the slot 12 is disposed transversely of the sear so that the sear cannot be actuated when the trigger is pulled. In this position of the catch the radial ribs 13 likewise seat in the radial grooves of the frame F, each of the ribs 13 having been shifted one groove in a counter-clockwise direction (Fig. 1) upon the movement of the catch C into a safe position. During the movement of the catch from firing to safe position or vice versa the members C and K, which are joined together as a unit, move downwardly against the action of spring Q sufficiently to permit the radial ribs 13 to ride out of the radial grooves in the frame F, the vertical lug on member C being sufficiently long and the clearance between the bottom of the member K and the sear being sufficiently great to permit this downward movement.

The operation of the improved magazine is as follows:—The magazine is detached by pressing inwardly upon the fingers 44 and 45 until the openings 46 and 47 disengage the heads of rivets 48 and 49 (Fig. 10) and is attached to the gun merely by inserting the magazine upwardly into the magazine opening until the spring fingers 44 and 45 snap over the heads of rivets 48 and 49, the upper ends of spring fingers 44 and 45 being bent inwardly as shown in Fig. 10 to cause the ends of the fingers to ride over the rivet heads. The beveled corners 54 of the upwardly extending fingers at the top of the magazine are so inclined and are so positioned relative to the ramp 70 (Fig. 5) that the rim of the cartridge rides up on the beveled corners 54 as the nose of the bullet rides over the ramp thereby maintaining the cartridge substantially horizontal as it is fed from the magazine to the firing chamber by the bolt, as illustrated in Fig. 5.

I claim:

1. A gun comprising a frame and a breech bolt reciprocatably mounted in the frame, the frame and bolt having forwardly and rearwardly extending fingers respectively adapted to interfit and guide the bolt in its reciprocatory movement.

2. A gun comprising a frame and a breech bolt reciprocatably mounted in the frame, the frame and bolt having forwardly and rearwardly extending fingers respectively adapted to interfit and guide the bolt in its reciprocatory movement, and a coil spring disposed within and guided by said fingers for actuating said bolt.

3. A gun comprising a frame and a breech bolt reciprocatably and rotatably mounted in the frame, the frame and bolt having forwardly and rearwardly extending fingers respectively adapted to interfit and guide the bolt in its reciprocatory movement and adapted to interengage and lock the bolt in closed position upon rotation of the bolt.

4. A gun comprising a frame and a breech bolt reciprocatably and rotatably mounted in the frame, the frame and bolt having forwardly and rearwardly extending fingers respectively adapted to interfit and guide the bolt in its reciprocatory movement, the ends of said fingers being adapted to interengage and lock the bolt in closed position upon rotation of the bolt into locked position.

5. A gun comprising a frame and a breech bolt reciprocatably and rotatably mounted in the frame, the frame and bolt having forwardly and rearwardly extending fingers respectively adapted to interfit and guide the bolt in its reciprocatory movement, the ends of said fingers being beveled to interengage along surfaces inclined to the line of breech pressure at such angles that the bolt will remain in locked position during high breech pressure but will automatically unlock directly in response to the breech pressure when the pressure decreases to a safe value.

6. A gun comprising a frame and a breech bolt reciprocatably and rotatably mounted in the frame, the frame and bolt having forwardly and readwardly extending fingers respectively adapted to interfit and guide the bolt in its reciprocatory movement and adapted to interengage and lock the bolt in closed position upon rotation of the bolt, and a coil spring disposed within and guided by said fingers for actuating said bolt.

7. A gun comprising a frame and a breech bolt reciprocatably and rotatably mounted in the frame, the frame and bolt having forwardly and rearwardly extending fingers respectively adapted to interfit and guide the bolt in its reciprocatory movement and adapted to interengage and lock the bolt in closed position upon rotation of the bolt, and a coil spring disposed within and guided by said fingers for actuating said bolt, said spring being subjected both to compression and torsion so as both to reciprocate and rotate said bolt.

8. A gun comprising a breech bolt, and a firing pin having a portion extending axially from the rear of the bolt and having two spaced pins extending into longitudinal openings in the bolt, one of said pins being adapted to extend entirely through the bolt to fire a cartridge.

9. A gun comprising a breech bolt, and a firing pin having a portion extending axially from the rear of the bolt and having two spaced pins extending into longitudinal openings in the bolt, one of said pins being radially displaced from the axis of the bolt and being adapted to extend entirely through the bolt to fire a cartridge.

10. A gun comprising a breech bolt and a firing pin having a portion extending axially from the rear of the bolt and having two spaced pins extending into longitudinal openings in the bolt, said pins being radially displaced from the axis of the bolt in opposite directions and one of the pins being adapted to extend entirely through the bolt to fire a cartridge.

11. A gun comprising a breech bolt arranged to reciprocate into and out of closed position and to rotate into and out of locked position, a firing pin associated with the bolt so as to rotate therewith and to extend rearwardly therefrom, and means including a trigger for actuating said firing pin, said means being arranged to render the trigger inoperative to actuate the firing pin by rotation of the bolt out of locked position.

12. A gun comprising a breech bolt arranged to reciprocate into and out of closed position and to rotate into and out of locked position, a firing pin associated with the bolt so as to rotate therewith and to extend rearwardly therefrom, and a sear and trigger associated with said pin so that rotation of the bolt out of locked position operatively disconnects the sear from the trigger.

Signed by me at New York, N. Y., this seventh day of August, 1919.

OSCAR V. PAYNE.